United States Patent [19]

Hauschild et al.

[11] Patent Number: 4,482,884
[45] Date of Patent: Nov. 13, 1984

[54] MONITORING DEVICE FOR DELIVERING AN ALARM SIGNAL IN DEPENDENCY ON A COUNTER RESULT

[75] Inventors: Wolfgang Hauschild, Bad Soden; Dieter Kruck, Idstein-Heftrich, both of Fed. Rep. of Germany

[73] Assignee: VDO Adolf Schindling AG, Frankfurt am Main, Fed. Rep. of Germany

[21] Appl. No.: 287,330

[22] Filed: Jul. 27, 1981

[30] Foreign Application Priority Data

Aug. 8, 1980 [DE] Fed. Rep. of Germany ....... 3030057

[51] Int. Cl.³ .................... B60Q 1/00; G08B 21/00
[52] U.S. Cl. .......................... 340/52 D; 235/95 R; 235/132 E; 340/688
[58] Field of Search ............... 340/52 D, 56, 688, 540; 235/132 E, 128, 95 R

[56] References Cited

U.S. PATENT DOCUMENTS 3,789,196 1/1974 Kinemura et al. ............. 235/132 E
3,925,754 12/1975 Ota et al. ........................ 340/56
4,284,972 8/1981 Chiu et al. ....................... 340/688
4,300,117 11/1981 Horii et al. ...................... 340/688

Primary Examiner—Glen R. Swann, III
Attorney, Agent, or Firm—Martin A. Farber

[57] ABSTRACT

A monitoring device for emitting an alarm signal by means of an alarm transmitter in dependency on the count result of a counter with at least one roller, particularly a kilometer counter, with a first sensing element which has a predetermined roller position for the emission of a first position-dependent signal. For emitting the alarm signal, from the second time of arrival of the roller from the zero position into the predetermined roller position, there is an activation circuit arrangement, also controlled in dependency on the roller position, which activation circuit arrangement before the second time of arrival of the roller into the predetermined roller position makes inoperative either the emission of the first position-dependent signal from the first sensing element or its retransmission to the alarm transmitter.

12 Claims, 6 Drawing Figures

MONITORING DEVICE FOR DELIVERING AN ALARM SIGNAL IN DEPENDENCY ON A COUNTER RESULT

BACKGROUND OF THE INVENTION

The invention concerns a monitoring device for delivering an alarm signal by means of an alarm transmitter in dependency on the counter result of a counter with at least one roller, particularly a kilometer counter, with a first sensing element which has a predetermined roller position for the emission of a first position-dependent signal.

Particularly in connection with electrically driven odometers in vehicles, the desire exists, after a given distance is covered, to produce an alarm signal which signalizes for example, certain maintenance or inspection operations. An electromotor driven counter provided for this comprises a roller or cylinder which, for example, completes a 90°—rotation upon reaching each 10,000 counter units—kilometers—and catches or locks in this position. This means that, starting out from an initial position of 0° with a roller position of 90°, 10,000 kilometers are indicated; with a roller position of 180°—20,000 kilometers; with a roller position of 270°—30,000 kilometers; with a roller position of 360° or 0°—40,000 kilometers and—with a second arrival of the roller into the 90° position—50,000 kilometers.

If, with such a counter with a sensing element, a higher counter position is to be monitored, the problem exists that the roller reaches the roller position assigned to this higher counter value not only at this higher counter value but also before, at a lower counter value, with a previous rotation. In the preceding example, this means that the roller position for the counter value 50,000 kilometers already appears before with a first rotation of the roller with the attainment of 10,000 kilometers.

It is the object of the present invention to create such a monitoring device which for monitoring of higher counter values, by which counter values the roller of the counter has completed more than one rotation, no false alarm occurs with a lower counter value and with which the movement of the counter is impeded as little as possible by the monitoring device, in order for the counter to be able to be driven trouble-free by a motor with a low moment of rotation. Moreover, the sensing or scanning detection of the roller position should take place preferably without contact by means of the sensing element.

SUMMARY OF THE INVENTION

This problem is aided in its solution with the monitoring device according to the invention in the manner that for emitting the alarm signal from the second time of arrival of the roller (1) from the zero position (Ra 1) into the predetermined roller position (Ra 2), there is an activation circuit arrangement (4, 6 in FIG. 2; 23 to 29 in FIG. 4), also controlled in dependency on the roller position, which activation circuit arrangement, before the second time of arrival of the roller into the predetermined roller position, makes inoperative either the emission of the first position-dependent signal from the first sensing element (3) or its retransmission (e,g. via 28, 29) to the alarm transmitter (5 or 33).

By means of the activation circuit arrangement, provided in accordance with the invention and controlled in dependency on the roller position, it is attained, without influencing the roller, that upon the sensing element's reaching the predetermined roller position, which roller position is associated with a higher as well as a lower counter value, the higher counter value only is reliably indicated but not the lower counter value. In the above-mentioned example, therefore, no signal which would represent a false alarm occurs in this case, when the roller jumps from the counter value 9,999 to 10,000 units. Rather, the alarm occurs only upon reaching 50,000 counter units.

With a construction of the monitoring device according to the principle that the emission of the first position-dependent signal—when the roller reaches the predetermined roller position with the lower counter position—is made inoperative, a development of the activation circuit arrangement in particular is provided with a second sensing element wherein the activation circuit arrangement comprises a second sensing element (4) which sensing element emits a second position-dependent signal in the rotation direction of the roller (1) between the predetermined roller position (Ra 2) and the zero position (Ra 1), which signal via a memory switch member (6), activates the first sensing element (3) for the subsequent emission of the first position-dependent signal (upon the second time of arrival of the roller into the predetermined roller position), which is in operative connection with the alarm transmitter (5). (FIG. 2). The memory switch member (6) is connected with the second sensing element (4), which switch member does not activate the first pick-up element 3 as long as the second sensing element 3 has not signalled a position (e.g. 3) of the roller after a first arrival of the roller into the predetermined roller position. Only thereafter does the memory switch member (6) of the activation circuit arrangement activate the first sensing element (3), which sensing element upon reaching the predetermined roller position (e.g. Ra 2) in the second rotation—which predetermined roller position corresponds to the higher counter value—enables the production of a position-dependent signal by the first sensing element. This position-dependent signal, produced by the first sensing element, then triggers the alarm transmitter.

Preferably, a second memory switch member (7) is arranged in this connection between the first sensing element 3 and the alarm transmitter (5). The second memory switch member memorizes the first position-dependent signal emitted by the first sensing element for the operation of the alarm transmitter even after the roller has left the predetermined roller position gain or when the monitoring device, for example when turning off the vehicle, is turned off and first turned on again at any later time. The alarm once triggered can, therefore, no longer automatically cease accidentally.

Each memory switch member can be developed electromechanically, but is however preferably constructed such that each memory switch member (6, 7) comprises a first transistor (13 or 17 respectively) with a fuse (14 or 18) arranged in the collector-emitter path, and a second transistor (12 or 21 respectively), the base connection of the latter being connected to a junction (15 or 19 respectively of the fuse and the first transistor (FIG. 3). This embodiment with slight expenditure enables an especially reliable long-time memorization. An especially inexpensive construction of the monitoring device, which monitoring device only needs a single sensing element, is that wherein the activation circuit arrangement has a memory AND-logic gate (27, 28, 29) with a memorizing first input (43), which input, by means of a first memory switch member (27), is prepared after the occurrence of the position-dependent signal emitted from the first sensing element during the first time of arrival of the roller into the predetermined roller position, and with a second input (47, 28), which second input is able to be applied (by means of the first memory switch member which prepared the first input 43) with the position-dependent signal emitted by the first sensing element upon the second time of arrival of the roller into the predetermined roller position such that the AND-logic circuit sends a signal to the alarm transmitter (33) (FIG. 4). In this contruction, the activation circuit arrangement is developed in such a way that it retransmits the first position-dependent signal, (which is emitted by the first sensing element, upon the movement of the roller into the predetermined roller position) to the alarm transmitter only when the roller has rotated again so that is has reached the roller position for the higher counter value. In particular, this retransmission occurs after completion of the first rotation of the roller. The activation circuit arrangement provided for this comprises, in particular, a circuit which is constructed in the manner of a logical AND-gate. This circuit however memorizes, first of all, the occurrence of the first signal given off by the first sensing element, so that the gate produces an output when, with a renewed rotation of the roller, the signal is emitted by the first sensing element for the second time. Only in this case is the alarm device placed in operation.

With a construction of the activation circuit arrangement comprising a second memory switch member (28) of such a type that the signal emission at the alarm transmitter occurs as a continuous signal, even after switching off and again switching the monitoring device on (FIG. 4), the result of the AND operation is also retained as soon as the first sensing element has signaled the second time of arrival at predetermined roller position at the higher counter value. As a result of the memory switch member already briefly above described which switch member is constructed with a fuse in a collector-emitter circuit of a transistor, which fuse burns out when the transistor conducts, the retransmission of the signal by the activation circuit arrangement occurs as a renewed continuous signal when the entire monitoring device is switched off for a while. In particular, the monitoring device with the activation circuit arrangement is constructed with conventional components, which activation circuit arrangement regulates the retransmission of the signal emitted by the firt sensing element to the alarm transmitter, advantageously wherein the activation circuit arrangement has a first monoflop (23) which can be controlled by the sensing element (3), and the output (25) of which is connected with an input of a second monoflop (24), the output (26) of which is connected with the base connection of a first transistor (40), in the collector-emitter path of which a fuse (41) is arranged, the junction (42) of the fuse with the transistor being coupled via a first diode (43) with the base of a second transistor (44), with which base furthermore, via a second diode (45), there is coupled the output (25) of the first monoflop (23), and the collector-emitter path of the second transistor (44), in which a fuse (46) is also arranged, is connected with the alarm transmitter (33) (FIG. 5) 7 with conventional components. This monitoring device can also be altered without difficulty for the alarm emission at such counter values when a counter value is to be signalled even during the first rotation of the counter roller.

In order not to produce a false alarm also upon placing the power supply in operation, for example upon the starting of the vehicle, a precaution is provided wherein a power supply line (50) of the first, second and third transistors can be switched on delayed in comparison to a power supply line (31) to the monoflaps and the sensing element, until the monoflops have reached their rest or steady state condition after the switching on (FIG. 5). By this certain component groups are turned on with delay after the sensing element and other pulse generators have reached their stationary condition.

In an especially reliable manner, the sensing of the roller position occurs without contact with a sensing element (3) developed as a Hall effect generator wherein a permanent magnet (2) is mounted at the counter roller (1) to be sensed made of non-ferromagnetic material.

Other sensing elements can, however, also be used in connection with the described monitoring device, in particular, a photoelectric detector element, which detector element also does not load the wheel train or roller of the counter and operates contact-free.

BRIEF DESCRIPTION OF THE DRAWINGS

Further advantages and features of the invention appear in the following description of preferred embodiments in connection with the following drawings, in which the invention is illustrated in more detail.

DETAILED DESCRIPTION OF THE PREFERRED EMBODIMENTS

Figure 1:
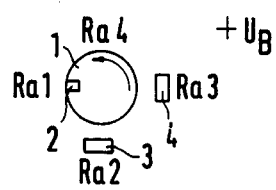
FIG. 1 is a side elevation showing the configuration of the roller or cylinder to a first and second sensing element in the first embodiment of the invention.

FIG. 1 shows a roller or cylinder 1 with drive means (not illustrated). On the circumference of the roller, a permanent magnet 2 is inserted in the roller which magnet interacts with the Hall effect elements 3 and 4. The Hall effect elements 3 and 4 constitute a first and second sensing element, respectively.

The roller can be rotated by 90°-steps from the initial position at Ra 1 in the direction of the arrow, each step corresponding to 10,000 counter units. At the position Ra 2, 10,000 counter units have been reached and, when the roller rotates for the second time to this position Ra 2, 50,000 counter units have been reached. This position is also designated as the predetermined roller position in the following. In the position Ra 3, 20,000 counter units are attained with the first rotation of the roller and, with the rest position Ra 4, 30,000 counter units during the firt rotation. The first sensing element 3 is now arranged in such a way that it detects the roller position at Ra 2, whereas the second sensing element 4 is arranged to detect the roller position at Ra 3.

Figure 2:
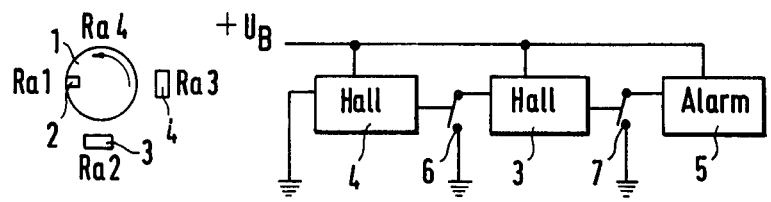
FIG. 2 is a block circuit diagram of the first embodiment.

The block circuit diagram in FIG. 2 shows how sensing elements 3 and 4 are connected to one another and with a first sensing element 3. The alarm transmitter 5 is activatable by a first memory switch member 6 which switch member is operated by the second sensing element 4. The first sensing element 3, in turn, operates a second memory switch member 7 in order to deliver a signal to the alarm transmitter 5.

This monitoring device operates in such a way that, first of all, in the initial position, see FIG. 1, the memory switch members are open, see FIG. 2. After 10,000 counter units, the magnet 2 comes into the range of the first sensing element 3, which sensing element does not, however, emit a pulse, since this sensing element cannot become active with an opened, first switch member 6. When the roller rotates further by 90°, the magnet 2 reches the second sensing element 4, which sensing element then closes the first memory switch member 6 and, thus, prepares the first sensing element 3 to be in a condition to emit a pulse in due course. This subsequent emission by the sensing element 3 occurs only when the magnet goes past the zero position Ra 1 for the second time and reaches the predetermined roller position Ra 2, that is, with the second rotation at a counter value of 50,000 counter units. Now by its pulse omission the first sensing element 3 can effect the closing of the second memory switch member 7, which starts the alarm transmitter 5.

The alarm transmitter also remains turned on then when the permanent magnet 2 is rotated out of the area of the first sensing element 3 or when a temporary current interruption occurs at the power supply circuit 8.

Figure 3:
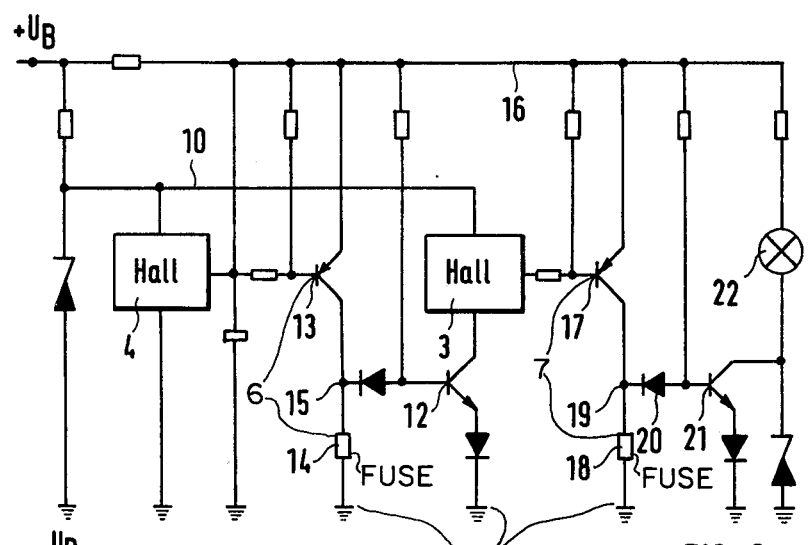
FIG. 3 is a detailed circuit diagram of the block circuit diagram according to FIG. 2.

FIG. 3 shows in detail how the second sensing element 4, a Hall effect element, is connected with the first sensing element 3, also a Hall effect element, so that the first sensing element 3 only detects the higher valued counter value and, upon reaching this trigers an alarm.

Moreover, the first sensing element 3, is only connected to a stabilized operating voltage, which operating voltage is between the line 10 and the ground potential 11, when a transistor 12 is brought into the conducting condition. This opening of the transistor 12, in the collector-emitter path of which the first sensing element 3 is connected, occurs when the magnet 2 in FIG. 1 reaches the position Ra 3 and thereby causes the second sensing element 4 to emit an output signal, which output signal switches a transistor 13 into the conducting condition. In this manner, a fuse 14 arranged in the collector-emitter path of the transistor 13 melts, so that a junction 15, between the fuse and the collector of the transistor 13, is no longer at ground potential but at the potential of the line 16 with a positive battery voltage, whereby the collector-emitter path of the transistor 12 also becomes conducting. The fuse 14 which is broken with the first emissioon of an output pulse from the second sensing element 4, thus together with the transistor 13 constitutes the first memory switch member 6, which switch member retains its closed position independent of the further signal course of the signal emitted by the second sensing element 4 and independent of interruption of the voltage on the line 16.

Since the first sensing element 3 is only activated when the magnet 2 has passed the position Ra 3, this first sensing element can only send a first position-dependent signal when the magnet 2 reaches the first sensing element in the position Ra 2 of the roller 1 for the second time. In this case, the first position-dependent signal, at an output of the first sensing element 3, controls a base of a further transistor 17, which transistor is thus placed in the conducting condition in order to allow a second fuse 18, inserted in its collector-emitter circuit, to melt. The transistor 17 with the fuse 18 thus constitutes the second memory switch member 7. After the melting of the fuse 18, the potential of the line 16 appears at a common junction 19 between the collector of the transistor 17 and the fuse 18, which potential via a diode 20 switches on an alarm transmitter which comprises essentially a transistor 21 and an alarm light 22 arranged in its collector-emitter circuit.

The remaining components—not numbered in FIG. 3—essentially serve for adjustment of the operating points of the described transistors.

Figure 4:
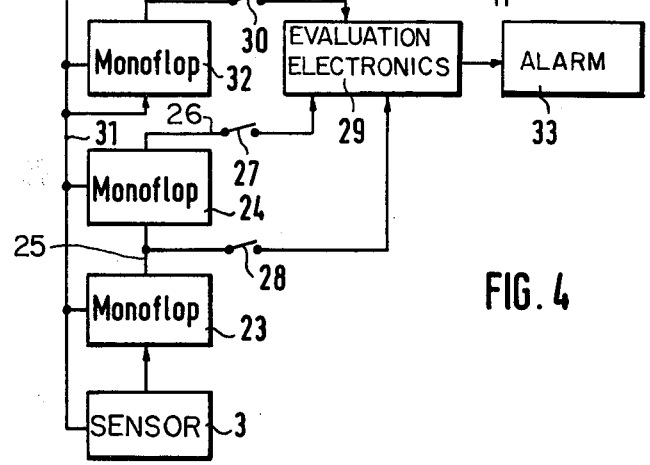
FIG. 4 is a second block circuit diagram of a second embodiment of the invention.
Figure 5:
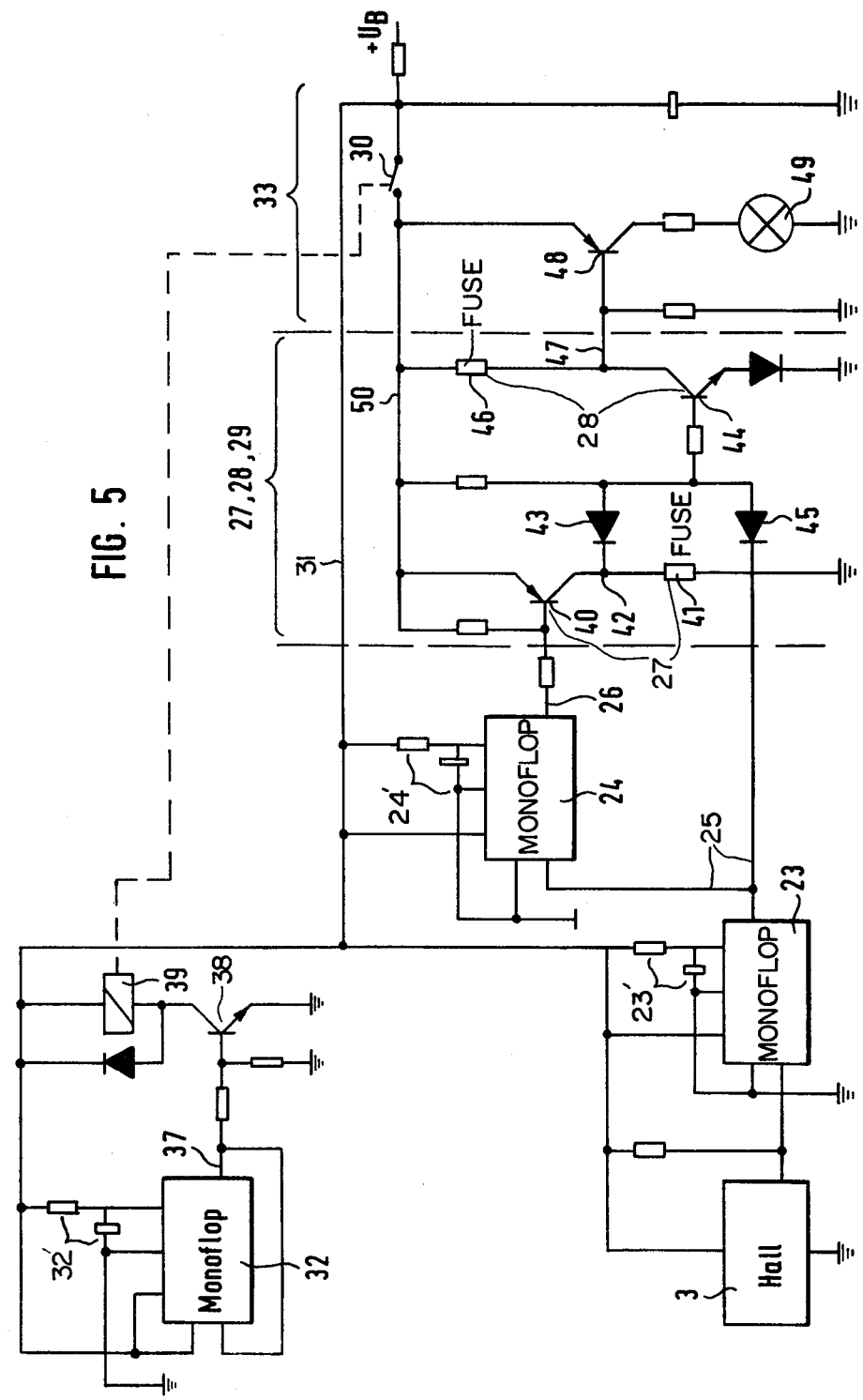
FIG. 5 is a detailed circuit of the block circuit diagram according to FIG. 4.

Another embodiment of the monitoring device according to FIG. 4 operates with the use of only one sensing element which sensing element is arranged at the roller position Ra 2 in FIG. 1. The second sensing element at the roller position Ra 3, therefore, is omitted. The element 3, which is a Hall effect element, is connected at its output with the input of a fist monoflop (monostable multivibrator) 23, the output of which in turn, is connected to the inlet of a second monoflop (monostable multivibrator) 24. The outlet 25 of the first monoflop 23 and the outlet 26 of the second monoflop 24 are connected via a second switch member 28 and a first switch member 27, respectively, with evaluation electronics 29. The evaluation electronics receive their operating voltage via a switch 30 over a line 50 from a power supply line 31 (FIG. 5). The swich 30 in this connection is switched on by a third monoflop (monostable multivibrator) 32, the input of which is connected with the power supply line.

The circuit arrangement according to FIG. 4 operates essentially in the following manner. Upon the occurrence of a position-dependent signal at the first element 3, the first monoflop (monostable multivibrator) 23 emits a first pulse at the outlet 25, see moment $t_1$ in FIG. 6. This pulse does not yet cause (as will be further explained below with the aid of FIG. 5) a closing of the second switch member 28, but kicks the monoflop 24 which then allows the first switch member 27 to continuously close, (see pulse course 27 in FIG. 6). In particular the negative flank of the pulse emitted by the element 3 and the pulse emitted by the first monoflop 23 respectively, causes the switching over of the devices connected with them. Since the evaluation electronics 29 have not yet received a signal from the second switch member 28, a signal emission does not yet result.

Figure 6:
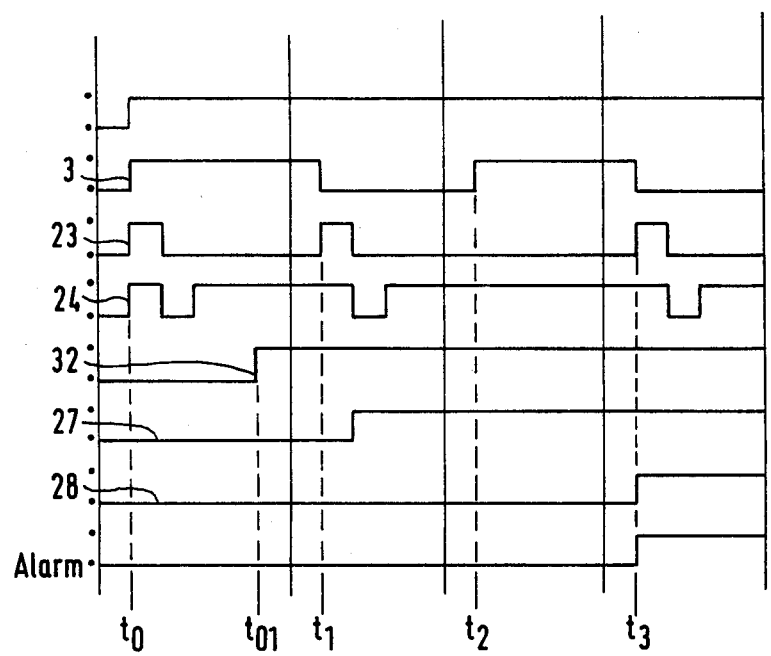
FIG. 6 is a waveform diagram of the circuit arrangement according to FIGS. 4 and 5 with waveforms indicated at various points in the circuits.

Only when the roller reaches the predetermined roller position for the second time, that is, now with the higher counter value, and again the Hall element emits a pulse with a negative flank as a first position-dependent signal (compare 3 at moment $t_3$ in FIG. 6) via the flip-flop 23 (by the—e.g. see discussion of FIG. 5—positive rising flank of the flipflop 23—see 23, $t_3$ in FIG. 6—caused by the negative flank from the sensing element 3) is the second second switch member 28 also closed, so that a pulse course appears in FIG. 6 which is transmitted by the evaluating electronics 29 to the alarm device 33 and the alarm device triggers an alarm. The alarm continues to be held on since the switch members 27 and 28 no longer open.

FIG. 6 further illustrates at the moment $t_2$ that a positive flank of the position-dependent signal, emitted by the first sensing element 3, does not produce any signal emission at the outputs 25 and 26 of the monoflops 23 and 24.

Further, FIG. 6 shows that output signals at the outputs 25 and 26 of the monoflops 23 and 24, which output signals occur at the moment $t_0$ when switching on the operating voltage at the line 31, do not influence the alarm emission since the evaluating electronics and the switch members 27 and 28 connected with them only become operative when the pulse of the monoflops as a result of turning on the operating voltage have died out. Moreover, the monoflop 32 sends a switching on signal to the switch 30 only at the moment $t_{01}$. The output signal length of the monoflop 32 amounts in this connection to approximately four times the output signal length of the monoflops 23 and 24.

In the detailed circuit of FIG. 5, the switch elements are provided with the same reference numbers as in FIG. 4, as far as they correspond. By dashed lines, it is moreover indicated in FIG. 5 in which circuit area the first and second switch member 27, 28 and the evaluating electronics 29 are formed. A further circuit section in FIG. 5 forms the alarm device 33. A resistor-capacitor (RC) combination 23′, 24′ and 32′ respectively for each monoflop can be seen in FIG. 5, which resistor-capacitor combination determines the pulse length of the emitted pulse at the respective monoflop output. The output 37 of the monoflop 32 is connected via a transistor 38 with a relay 39, which relay applies the operating voltage to the switch members 27, 28, the evaluating electronics 29 and the alarm transmitter 33.

The first switch member 27 is formed by a transistor 40 together with a fuse 41 in its collector-emitter circuit, which fuse burns out with a conducting transistor. A common junction 42 between the fuse 41 and the collector of the transistor 40 is connected over a diode 43 with the base of a further transistor 44. The diode 43, coupled in this way, forms a first memory input of a circuit part, which circuit part, together with a second diode 45, has the function of an AND-gate —since the transistor 44 conducts when a positive potential exists not only at the common junction 42 but also at the output 25 of the first monoflop 23, to which the diode 45 leads.

The circuit part 27, 28, 29 works such that, with a first position-dependent signal at the output 25 of the monoflop 23, the transistor 44 does not conduct since its base is at zero potential via the diode 43. By the negative flank of the monoflop 23 via the monoflop—or monoflap—24, after the moment $t_1$—compare FIG. 6—the transistor 40 becomes conducting and the connection between the diode 43 and the ground potential is broken by the melting of the fuse 41. Only then the next position-dependent signal (the positive flank—see $t_3$, waveform of 23 in FIG. 6 which is effected by the negative flank from the sensing element 3—see $t_3$, waveform of 3 in FIG. 6) at the output 25 of the monoflop 23 causes the base of the transistor 44 to receive a positive potential, and the transistor 44 conducts and a fuse 46 burns out in its collector-emitter circuit.

From the foregoing, it follows that the transistor 44 with the fuse 46 forms the second switch member 28, which switch member switches over an input 47 of the alarm device 33 from positive potential to approximately zero potential and leaves it in this position, once the fuse 46 is melted.

Thus, a transistor 48 comes into the conducting condition and an alarm light 49 continually lights up in its collector-emitter circuit.

The alarm light 49 also lights up when the operating voltage is interrupted and is again applied to the alarm device after exciting the relay 39 to close the switch contact 30, since the switch members, which are realized by means of the fuses 41 and 46, retain their switched position.

We claim:

1. In monitoring device for emitting an alarm signal by actuation of an alarm transmitter in response to a predetermined count result of a counter with at least one roller, particularly a kilometer counter, with a sensing element responsive to a predetermined roller position for emission of a position-dependent signal for actuating the alarm transmitter, the improvement comprising
an activation circuit arrangement means responsive to the position of the roller for preventing the sensing element from actuating the alarm transmitter before a second time of arrival of the roller into the predetermined roller position and for allowing the sensing element (via the position-dependent signal) to actuate the alarm transmitter for emitting the alarm signal upon the second time of arrival of the roller from a zero position into the predetermined roller position.

2. The monitoring device according to claim 1, wherein
said activation circuit arrangement means prevents the emission of the position-dependent signal from the sensing element before the second time of arrival of the roller into the predetermined roller position.

3. The monitoring device according to claim 1 or 2, wherein
the activation circuit arrangement means comprises,
a second sensing element, the latter comprising means for emitting a second position-dependent signal responsive to said roller's reaching a designated position between the predetermined roller position and the zero position (in the normal rotation direction of the roller), and
a memory switch means responsive to said second position-dependent signal for activating said first-recited sensing element for subsequent emmission of said first-recited position-dependent signal upon the second time of arrival of the roller into said predetermined roller position, said first-recited sensing element being in operative connection with the alarm transmitter.

4. The monitoring device according to claim 3, further comprising
second memory switch means for connecting said sensing element with the alarm transmitter.

5. The monitoring device according to claim 4, wherein
each said memory switch means comprises,
a first transistor and a fuse arranged in the collector-emitter path thereof, and
a second transistor having a base connection connected to a junction of said fuse and the first transistor.

6. The monitoring device according to claim 1, wherein
said activation circuit arrangement means prevents transmission of the position-dependent signal to the alarm transmitter before the second time of arrival of the roller into the predetermined roller position.

7. The monitoring device according to claim 1 or 6, wherein
the activation circuit arrangement means has an AND-logic gate with a first input and a first memory switch means for actuating said first input upon occurrence of the position-dependent signal emitted from the sensing element during a time of arrival of the roller into the predetermined roller position, and a second input, which second input receives the position-dependent signal emitted by the sensing element upon the second time of arrival of the roller into the predetermined roller position such that the AND-logic gate sends a signal to the alarm transmitter.

8. The monitoring device according to claim 7, wherein
said activation circuit arrangement means comprises a second memory switch means for maintaining a continuous signal to the alarm transmitter even after switching off and again switching on the monitoring device.

9. The monitoring device according to claim 7, wherein
said activation circuit arrangement means comprises,
a second monoflop means and a first monoflop means, the latter being controlled by said sensing element and having an output connected with an input of said second monoflop means,
a first transistor having a base connected with an output of said second monoflop means,
a fuse arranged in the collector-emitter path of said first transistor,
a second transistor,
a first diode coupling a junction of the fuse with the first transistor with the base of the second transistor,
a second diode coupling the output of said first monoflop means with the base of the second transistor, and
another fuse arranged in the collector-emitter path of the second transistor,
said collector-emitter path of the second transistor being connected with the alarm transmitter.

10. The monitoring device according to claim 9, wherein
said alarm transmitter comprises,
a third transistor having a base connected to a junction of said another fuse and said second transistor, and
an alarm means arranged in the collector-emitter path of said third transistor.

11. The monitoring device according to claim 10, further comprising
a first power supply line means to said first and second monoflop means and said sensing element, and
a second power supply line means to said transistor for being switched on with delay in comparison to said first power supply line means to allow said monoflop means to reach their steady state condition after switching on said device.

12. The monitoring device according to claim 1, wherein
said sensing element is a Hall effect element, and
a permanent magnet is mounted on said roller to be sensed, said roller being made of non-ferromagnetic material.

* * * * *